(No Model.)
A. J. PETCH.
PLOW ATTACHMENT.
No. 499,577. Patented June 13, 1893.
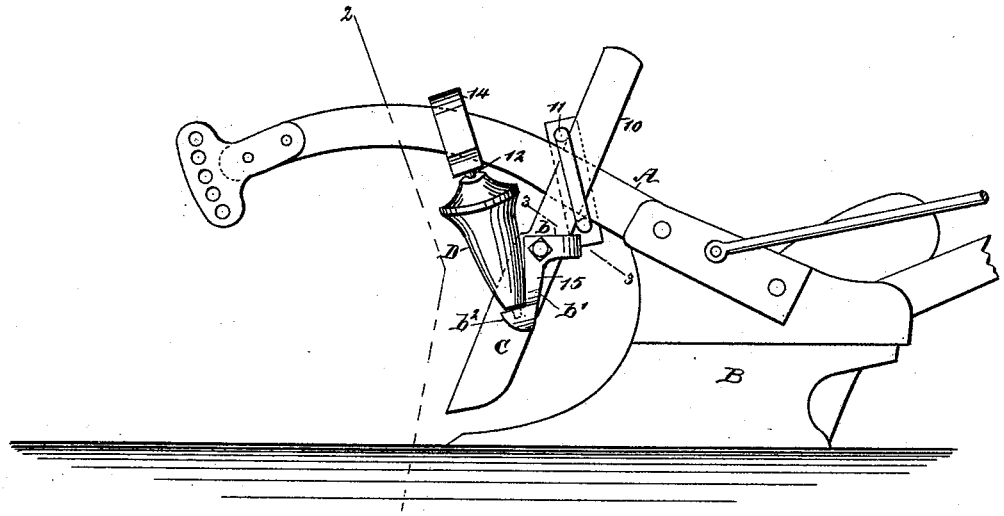
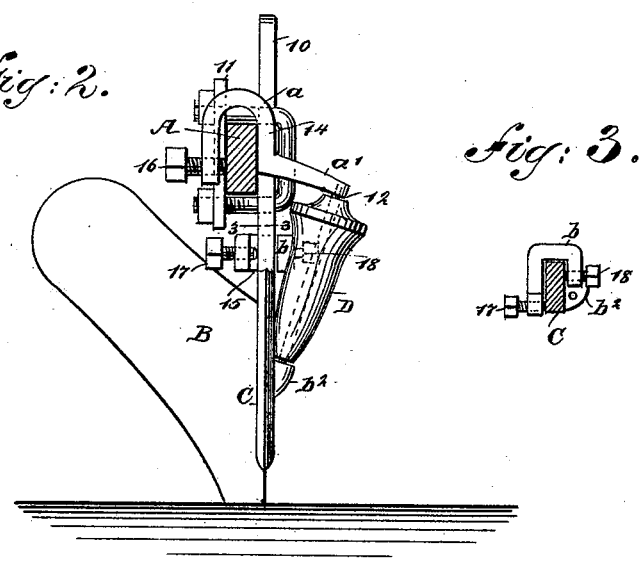
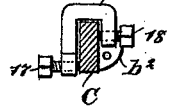
WITNESSES:
Chas. Nieder
C. Sedgwick
INVENTOR
A. J. Petch
BY
Munn & Co
ATTORNEYS.

UNITED STATES PATENT OFFICE.

ARTHUR JOHN PETCH, OF AURORA, CANADA.

PLOW ATTACHMENT.

SPECIFICATION forming part of Letters Patent No. 499,577, dated June 13, 1893.

Application filed March 22, 1893. Serial No. 467,136. (No model.)

*To all whom it may concern:*

Be it known that I, ARTHUR JOHN PETCH, of Aurora, in the county of York, Province of Ontario, and Dominion of Canada, have invented a new and useful Improvement in Plow Attachments, of which the following is a full, clear, and exact description.

My invention relates to an improvement in plow attachments, and it has for its object to provide a colter or cutter blade of a plow beam with a clearing roller, so arranged that it will extend at an inclination in front of one side of the colter or cutter, and thus prevent the colter or cutter from injuring roots such as carrots and like vegetables while being plowed up, and assist in the turning over of the ground when the plow with which it is connected is used for that purpose. The clearing roller also serves to prevent the colter or cutter from becoming clogged by trash, and will direct such material away from the colter or cutter and to one side of the plow.

Another feature of the invention is to provide a means whereby the clearing roller may be conveniently and expeditiously attached to plow beams of any description, and whereby also the roller may be adjusted both vertically and laterally.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of a plow having the improvement applied thereto. Fig. 2 is a vertical section through the plow beam, the attachment being shown in front elevation and the section being taken practically on the line 2—2 of Fig. 1; and Fig. 3 is a horizontal section through the colter or cutter blade, said section being taken practically on the line 3—3 of Fig. 1.

The plow beam, A, plow share, B, and colter, or cutter, C, are of a common or well-known type, and the colter is attached to the beam by a clip, 11, in the usual way.

The clearing roller D, is preferably made somewhat conical in general contour, its widest portion being near the top, and the roller is also preferably made with a bore extending through from end to end, adapted to receive a spindle or shaft 12, the pin loosely fitting in said bore. The roller is held in its intended position preferably through the medium of two brackets, an upper bracket 14 and a lower bracket 15, the upper bracket being connected with the beam while the lower bracket is connected with the colter or cutter blade. The upper bracket may be changed as to shape according to the character of the plow beam, but the lower bracket will be of substantially the construction illustrated. The upper bracket comprises a yoke or inverted U-shaped body $a$, as shown best in Fig. 2, and an arm $a'$ projected from one of the members of the body. The arm $a'$ may be straight, or inclined upward, or downward as is shown in the drawings. This bracket is adjustably held upon the plow beam preferably through the medium of a set screw 16, which is passed through the member of the body opposite that carrying the arm $a'$. The lower bracket is of somewhat irregular shape, and comprises a horizontal yoke or U-like body $b$, an arm $b'$, which extends downward from one of the members of the body at a right angle thereto the lower end of the arm $b'$, being provided with a step $b^2$, and the step $b^2$, is provided with a socket. The arm $a'$ of the upper bracket, it may here be remarked, is provided with an opening, the socket in the step of the lower bracket and the opening in the arm of the upper bracket being adapted to receive the ends of the roller spindle or shaft 12. The yoke-like body of the lower bracket 15, is made to receive the colter blade C, immediately below the beam, one member passing across each side of the blade from the back thereof; consequently the arm $b'$ of the yoke will extend downward diagonally across the blade, since the blade is given a forward inclination; and the lower bracket is then secured to the blade preferably through the medium of two clamp screws 17 and 18, one being passed through each member of the yoke, as shown best in Fig. 3. The spindle 12 of the roller, the roller having been placed upon it, is then entered in the recess of the lower bracket step $b^2$, and the upper end of the spindle is placed in the opening in the upper bracket arm; the upper bracket is then adjusted so as to give the roller a proper forward inclination. The roller will then be located at one side of the colter or cutter blade and will stand diagonally in advance of it, and by manipulating the clamp screws in either or both of the brackets more or less inclination may be given to the roller or it may be adjusted vertically or laterally, as occasion may demand. The roller being tapering and widest at its top, any material rising upward in front of the colter or cutter will be prevented from passing up over the top of the roller and will be compelled to pass at one side; and the roller occupying the advanced diagonal position illustrated, will effectually keep the cutting edge of the colter or blade clear from obstructions, and will serve to prevent the blade from injuring the roots of carrots or other vegetables that the plow may be used for turning up; it is also evident that the roller, as has heretofore been stated, will materially assist in turning over the soil when it is used in connection with a turning over plow.

The attachment can be used upon either side of a plow colter or beam.

Having thus described my invention, I claim as new and desire to secure by Letters Patent—

1. The combination, with a plow beam and a colter or cutter blade connected therewith, of a bracket adjustably located upon the beam, a second bracket adjustably attached to the colter or cutter blade, and a roller journaled between the two brackets, the roller being located at one side of the colter or cutter blade and having a forward inclination, substantially as shown and described.

2. The combination, with the plow-beam and colter, or cutting blade, of the upper bracket, 14, having a curved portion or yoke, $a$, which embraces the beam, and a laterally-projecting arm, $a'$, and the lower bracket 15, having a yoke, $b$, and arm, $b'$, provided with the socket step, $b^2$, the roller, D, journaled in the arm and step of the respective brackets, and clamp-screws for securing said brackets adjustably, as specified.

ARTHUR JOHN PETCH.

Witnesses:
ELLIS LLOYD,
J. E. MCNALLY.